United States Patent
Lu et al.

(10) Patent No.: US 9,918,327 B2
(45) Date of Patent: *Mar. 13, 2018

(54) METHODS AND NETWORK NODES FOR COMMUNICATION BETWEEN A FIRST NETWORK NODE AND A SECOND NETWORK NODE OVER A TWISTED PAIR WIRE

(71) Applicant: Telefonaktiebolaget LM Ericsson (publ), Stockholm (SE)

(72) Inventors: Chenguang Lu, Sollentuna (SE); Elmar Trojer, Taby (SE); Jacob Osterling, Jarfalla (SE); Miguel Berg, Upplands Vasby (SE); Per-Erik Eriksson, Stockholm (SE); Ralf Bergqvist, Bromma (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/144,100

(22) Filed: May 2, 2016

(65) Prior Publication Data

US 2016/0249370 A1    Aug. 25, 2016

Related U.S. Application Data

(63) Continuation of application No. 13/521,516, filed as application No. PCT/EP2012/063128 on Jul. 5, 2012, now Pat. No. 9,380,636.

(51) Int. Cl.
- *H04B 3/36* (2006.01)
- *H04B 3/58* (2006.01)

(Continued)

(52) U.S. Cl.
CPC ........ *H04W 72/085* (2013.01); *H04B 1/0071* (2013.01); *H04B 3/487* (2015.01);
(Continued)

(58) Field of Classification Search
CPC .................................................. H04W 72/085
(Continued)

(56) References Cited

U.S. PATENT DOCUMENTS

| | | |
|---|---|---|
| 5,870,392 A | 2/1999 | Ann |
| 6,014,546 A | 1/2000 | Georges et al. |

(Continued)

FOREIGN PATENT DOCUMENTS

| | | |
|---|---|---|
| CN | 1471331 | 1/2004 |
| CN | 102377470 | 3/2012 |

(Continued)

OTHER PUBLICATIONS

International Search Report Corresponding to International Application No. PCT/EP2012/063128; dated Apr. 4, 2013; 4 Pages.

(Continued)

*Primary Examiner* — Tilahun B Gesesse
(74) *Attorney, Agent, or Firm* — Sage Patent Group

(57) ABSTRACT

A first network node of a cellular system is configured for communication with a second network node over a twisted pair wire. The first network node includes a receiver for receiving, over the twisted pair wire, an intermediate frequency signal from the second network node, which intermediate frequency signal has been converted from a high frequency signal having a frequency higher than the frequency of the intermediate frequency signal by the second network node, and a down-converter for converting the intermediate frequency signal to a low frequency signal having a frequency lower than the frequency of the intermediate frequency signal. The first network node also (Continued)

includes an up-converter for converting a received low frequency signal to an intermediate frequency signal having a frequency higher than the frequency of the low frequency signal.

24 Claims, 8 Drawing Sheets

(51) Int. Cl.
    *H04B 7/14*           (2006.01)
    *H04W 72/08*        (2009.01)
    *H04W 24/02*        (2009.01)
    *H04W 84/04*        (2009.01)
    *H04B 3/487*        (2015.01)
    *H04B 1/00*          (2006.01)
    *H04W 16/10*        (2009.01)
    *H04W 16/32*        (2009.01)
    *H04W 72/04*        (2009.01)
    *H04W 88/08*        (2009.01)

(52) U.S. Cl.
    CPC ........... *H04W 16/10* (2013.01); *H04W 16/32* (2013.01); *H04W 24/02* (2013.01); *H04W 72/0453* (2013.01); *H04W 84/045* (2013.01); *H04W 88/085* (2013.01)

(58) Field of Classification Search
    USPC .................................................. 455/14, 142
    See application file for complete search history.

(56) References Cited

U.S. PATENT DOCUMENTS

| | | |
|---|---|---|
| 6,864,834 B2 | 3/2005 | Walton |
| 7,123,648 B2 | 10/2006 | Ogawa |
| 7,684,435 B2 | 3/2010 | Kim et al. |
| 7,702,298 B2 | 4/2010 | Barratt et al. |
| 7,848,770 B2 | 12/2010 | Scheinert |
| 9,107,203 B2 | 8/2015 | Spagnolini et al. |
| 2002/0052188 A1* | 5/2002 | Behbahani ........... H04B 7/2609 455/402 |
| 2002/0103012 A1 | 8/2002 | Kim et al. |
| 2004/0213170 A1 | 10/2004 | Bremer |
| 2005/0220180 A1 | 10/2005 | Barley et al. |
| 2007/0097939 A1 | 5/2007 | Nylander et al. |
| 2008/0174502 A1 | 7/2008 | Oren et al. |
| 2009/0180438 A1 | 7/2009 | Mazawa et al. |
| 2009/0264125 A1 | 10/2009 | Rofougaran |
| 2009/0296641 A1 | 12/2009 | Bienas et al. |
| 2009/0305671 A1 | 12/2009 | Luft et al. |
| 2009/0307540 A1 | 12/2009 | Razazian et al. |
| 2009/0316649 A1 | 12/2009 | Chen |
| 2010/0099366 A1 | 4/2010 | Sugar et al. |
| 2011/0130163 A1 | 6/2011 | Saban et al. |
| 2011/0135013 A1 | 6/2011 | Wegener |
| 2011/0170476 A1 | 7/2011 | Shapira et al. |
| 2012/0177026 A1 | 7/2012 | Uyehara et al. |
| 2015/0327237 A1 | 11/2015 | Spagnolini et al. |

FOREIGN PATENT DOCUMENTS

| | | |
|---|---|---|
| CN | 102378190 | 3/2012 |
| EP | 0938241 A2 | 9/1999 |
| GB | 2 459 107 A | 10/2009 |
| WO | WO 97/08840 | 3/1997 |
| WO | WO 97/40590 A1 | 10/1997 |
| WO | WO 2004/051804 A1 | 6/2004 |
| WO | WO 2005/120101 A1 | 12/2005 |
| WO | WO 2008/076432 A1 | 6/2008 |
| WO | WO 2009/053710 A1 | 4/2009 |
| WO | WO 09/151893 | 12/2009 |
| WO | WO 2009/155602 A1 | 12/2009 |
| WO | WO 2010/089719 A1 | 8/2010 |
| WO | WO 2011/104299 A1 | 9/2011 |

OTHER PUBLICATIONS

Search Report corresponding to Chinese Patent Application No. 2012800745070, dated Sep. 1, 2017, 5 pages (Chinese- and English-language versions).

\* cited by examiner

METHODS AND NETWORK NODES FOR COMMUNICATION BETWEEN A FIRST NETWORK NODE AND A SECOND NETWORK NODE OVER A TWISTED PAIR WIRE

CROSS-REFERENCE TO RELATED APPLICATIONS

This application is a continuation of U.S. patent application Ser. No. 13/521,516, having a 371(c) date of Nov. 8, 2012, which is a 35 U.S.C. § 371 national stage application of PCT International Application No. PCT/EP2012/063128, filed on Jul. 5, 2012, the disclosures of which are hereby incorporated by reference herein in their entireties.

TECHNICAL FIELD

The present disclosure relates generally to methods and network nodes for communication between a first network node and a second network node over a twisted pair wire.

BACKGROUND

In cellular systems, to further increase mobile network capacity, heterogeneous networks have been employed. An example of a typical heterogeneous network is shown in FIG. 1. The heterogeneous network of FIG. 1 comprises a macro base station, BS 11 covering a geographical area of a macro cell 12 and two pico BSs 21, 31 each covering a geographical area of a pico cell 22, 32. As seen in the figure, the coverage area of the macro cell is much larger than the coverage area of the pico cells. Consequently, the pico BSs communicate with a lower power than the macro BS. Further, the pico BSs are backhauled, i.e. they are each connected via a link 23, 33 to the mobile network, via the macro BS. The link may be a physical link, a micro wave link, a radio link etc.

Pico BSs may be deployed in small areas where traffic demand is high, such as indoor environment, for example in offices. In such high-demand areas it may be difficult to find fiber connections for the backhaul connection from the pico BS to a macro BS. To deploy fiber infrastructure to such pico BSs is both costly and time-consuming. Although, in many high-demand areas, for example in office buildings, there may be existing twisted pair wires, such as copper wires, for example DSL lines or Cat 5 cables. It would be advantageous if existing twisted pair wires could be reused for the backhaul connections between a pico BS and a macro BS.

Further, there are mainly two types of Heterogeneous network deployment of pico cells. The first type is called an independent pico cell deployment. In this case, the pico BS functions as a simplified macro BS with lower power and less base band processing capability. Consequently, in the independent pico cell deployment, the received signal is converted into the base band and at least partly processed in the pico BS such that only IP backhaul communication is required.

The second type of heterogeneous network deployment is called Remote Radio Unit-based (RRU-based) pico cells. Here, a pico BS only comprises a radio frequency subsystem, e.g. performing IQ sampling, and the RF signal is converted to a base band signal which is forwarded to a centralized base band unit in the macro BS. For RRU-based pico cells, an improved network performance is achieved since joint processing of signals received from several pico BSs can be achieved at the base band unit at the macro BS. According to prior art, the RF signal is converted to a base band signal which is forwarded to a base band unit in the macro BS via a Common Public Radio Interface (CPRI). In the base band unit the signal is processed and decoded. When using CPRI the RF signal is over-sampled and transferred in bits in the base band. This requires very high capacity, typically at least 1.25 Gbit/s and very low latency, typically less than 250 µs. Also, even if there is no data to transfer, the over-sampling has to be performed. Due to the high capacity requirements and the low latency requirements, the CPRI is not possible, or at least disadvantageous, to use for transferring signals over a twisted-pair wire between an RRU-based pico BS and a macro BS. Consequently, there is a need for another solution for transferring signals between a pico BS and a macro BS, especially for communication between an RRU-based pico BS and a macro BS.

SUMMARY

It is an object of the invention to address at least some of the problems and issues outlined above. More particularly, it is an object to achieve a communication over a twisted pair wire between a first network node and a second network node, which communication has at least one of the following advantages: high transmission capacity, low transmission losses and low latency sensibility.

It is possible to achieve these objects and others by using a method and an apparatus as defined in the attached independent claims.

According to a first aspect, a method is provided performed by a first network node of a cellular system for communication between the first network node and a second network node over a communication channel comprising a twisted pair wire. The method comprises receiving, over the communication channel comprising the twisted pair wire, an intermediate frequency signal from the second network node, which intermediate frequency signal has been converted by the second network node from a high frequency signal having a frequency higher than the frequency of the intermediate frequency signal, and converting the intermediate frequency signal to a low frequency signal having a frequency lower than the frequency of the intermediate frequency signal. This method relates to taking care of uplink communication in a first network node.

According to a second aspect, a method is provided performed by a first network node of a cellular system for communication between the first network node and a second network node over a communication channel comprising a twisted pair wire. The method comprises: converting a received low frequency signal to an intermediate frequency signal having a frequency higher than the frequency of the low frequency signal, and transmitting, over the communication channel comprising the twisted pair wire, the intermediate frequency signal to the second network node for subsequent conversion at the second network node into a high frequency signal having a frequency higher than the frequency of the intermediate frequency signal. This method relates to taking care of downlink communication in a first network node.

According to a third aspect, a first network node of a cellular system is provided, for communication with a second network node over a twisted pair wire. The first network node comprises: a receiver for receiving, over the twisted pair wire, an intermediate frequency signal from the second network node, which intermediate frequency signal has been converted from a high frequency signal having a frequency higher than the frequency of the intermediate frequency signal by the second network node, and a down-converter for converting the intermediate frequency signal to a low frequency signal having a frequency lower than the frequency of the intermediate frequency signal. The first network node also comprises an up-converter for converting a received low frequency signal to an intermediate frequency signal having a frequency higher than the frequency of the low frequency signal, and a transmitter for transmitting, over the twisted pair wire, the intermediate frequency signal to the second network node for subsequent conversion into a high frequency signal with a frequency higher than the frequency of the intermediate frequency signal at the second network node According to a fourth aspect, a method in a cellular system is provided for communication between a first network node and a second network node over a twisted pair wire. The method comprises, at the second network node, converting a high frequency signal, which high frequency signal has been received over a wireless interface, to an intermediate frequency signal having a frequency lower than the frequency of the high frequency signal, and transmitting, over the twisted pair wire, the intermediate frequency signal to the first network node. The method further comprises, at the first network node, receiving the intermediate frequency signal from the second network node, and converting the received intermediate frequency signal to a low frequency signal having a frequency lower than the frequency of the intermediate frequency signal. The method describes handling of communication in an uplink direction at the first and the second network node.

According to a fifth aspect, a method in a cellular system is provided for communication between a first network node and a second network node over a twisted pair wire. The method comprises, at the first network node, converting a received low frequency signal to an intermediate frequency signal having a frequency higher than the frequency of the low frequency signal, and transmitting, over the twisted pair wire, the intermediate frequency signal to the second network node. The method further comprises, at the second network node, receiving the intermediate frequency signal from the first network node, and converting the received intermediate frequency signal to a high frequency signal having a frequency higher than the frequency of the intermediate frequency signal. The method describes handling of communication in a downlink direction at the first and the second network node According to a sixth aspect, a cellular system is provided comprising a first network node and a second network node arranged for communication between the first network node and the second network node over a twisted pair wire. The first network node comprises a receiver for receiving, over the twisted pair wire, an intermediate frequency signal from the second network node, a down-converter for converting the received intermediate frequency signal to a low frequency signal having a frequency lower than the frequency of the intermediate frequency signal, an up-converter for converting a low frequency signal to an intermediate frequency signal having a frequency higher than the frequency of the low frequency signal, and a transmitter for transmitting, over the twisted pair wire, the intermediate frequency signal to the second network node. The second network node comprises a receiver for receiving, over the twisted pair wire, an intermediate frequency signal from the first network node, an up-converter for converting the received intermediate frequency signal to a high frequency signal having a frequency higher than the frequency of the low frequency signal, a down-converter for converting a high frequency signal to an intermediate frequency signal having a frequency lower than the frequency of the high frequency signal, and a transmitter for transmitting, over the twisted pair wire, the intermediate frequency signal to the second network node.

The above methods and network nodes may be configured and implemented according to different optional embodiments. In one possible embodiment the first network node is arranged to transmit/receive intermediate frequency signals to/from a plurality of second network nodes over separate communication channels comprising twisted pair wires, wherein each of the communication channels connecting one of the plurality of second network nodes with the first network node. The method further comprises estimating transmission quality for the communication channels, and allocating intermediate frequencies to the communication channels based on the estimated transmission qualities such that a first of the communication channels having a first estimated transmission quality is allocated a lower intermediate frequency than a second of the communication channels having a second estimated transmission quality higher than the first estimated transmission quality.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Briefly described, a solution is provided to achieve a communication over a twisted pair wire between a first network node and a second network node, which communication has at least one of the following advantages: high transmission capacity, low transmission losses and low latency sensibility. The first network node may be a first base station, e.g. a macro base station and the second network node may be a second base station, e.g. a pico base station. These advantages (or at least one of them) may be achieved by forwarding a signal between the first and the second network node over a twisted pair wire at an intermediate frequency (IF). Further, the IF signal is converted to and from a baseband frequency at the first network node and the IF signal is converted to and from a high (radio) frequency at the second network node. By transmitting the signal between the first and the second base station at an IF frequency, there is low transmission losses compared to transmitting at a high (radio) frequency. Further, compared to transmitting the signal at a base band frequency via e.g. CPRI, less transmission capacity is needed and there is low latency sensibility in comparison to the CPRI method.

Figure 1:
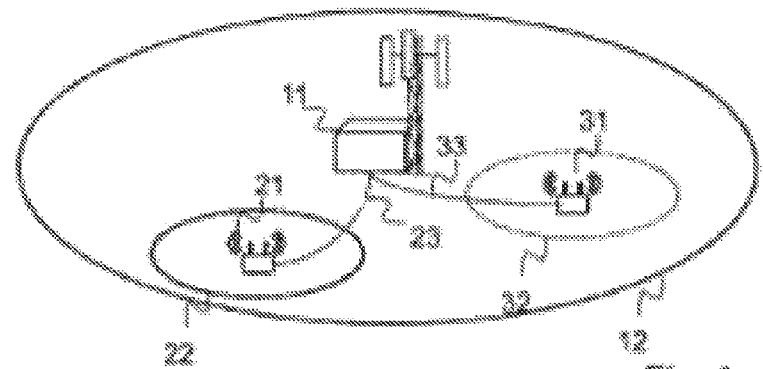
FIG. 1 is a schematic block diagram illustrating a heterogeneous network architecture.
Figure 2:
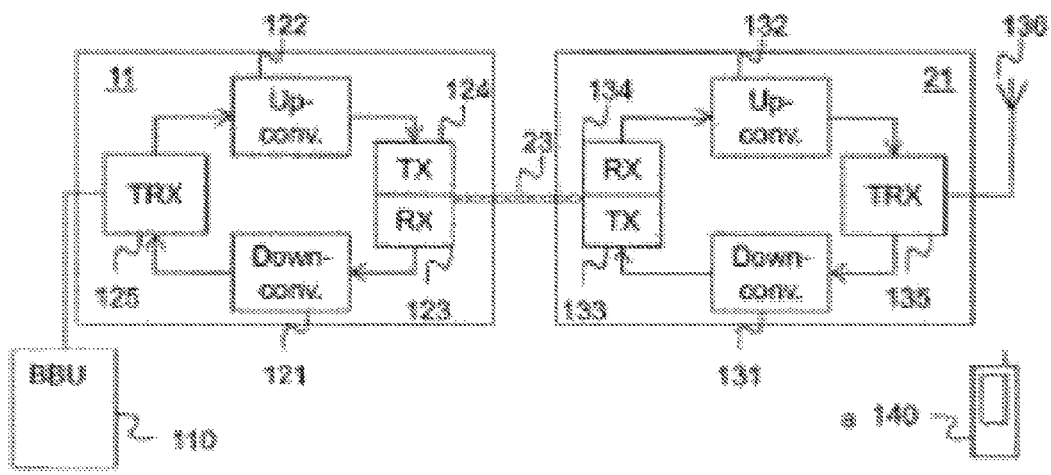
FIG. 2 is schematic block diagram illustrating an architecture for transmission between a second network node and a first network node over a twisted pair wire, according to an embodiment.

FIG. 2 describes a system according to an embodiment for transmitting signals between a first BS 11 and a second BS 21 over a twisted pair wire 23. The first BS 11 comprises a transceiver (TRX) 125 for receiving and transmitting signals from a base band unit 110. The TRX may also be realized by separate transceiver and receiver units. Further, the first BS 11 comprises an up-converter 122 for converting signals from a base band frequency to an intermediate frequency and a down-converter 121 for converting signals from an intermediate frequency to a base band frequency. The first BS also comprises a transmitter (TX) 124 and a receiver (RX) 123 for receiving and transmitting IF signals to/from the second base station 21 via the twisted-pair wire 23.

The second BS 21 comprises a TRX 135 for receiving and transmitting signals via an antenna 136 over an air interface to a UE 140. The TRX 135 may be realized by separate TX and RX units. Further, the second BS 21 comprises an up-converter 132 for converting signals from an intermediate frequency to a high frequency, and a down-converter 131 for converting signals from the high frequency to the intermediate frequency. The second BS also comprises a TX 133 and an RX 134 for receiving and transmitting IF signals to/from the first base station 11 via the twisted-pair wire 23.

According to the embodiment, when a signal is transmitted downlink (from the wireless network to the UE), it is transmitted as a base band signal from the base band unit 110 to the TRX 125 of the first base station. Then the signal is converted by the up-converter 122 of the first base station to an IF signal, which IF signal is transmitted over the twisted pair wire 23 by the TX 124 of the first BS to the second BS 21 where the transmitted IF signal is received at the RX 134 of the second BS. The IF signal is then in the second BS converted by the up-converter 132 to a high frequency signal which high frequency signal is transmitted by the TRX 135 as a high frequency radio signal via the antenna 136 over an air interface to the UE 140.

Similarly, when a signal is transmitted uplink (from the UE to the wireless network), it is transmitted as a high frequency radio signal from the UE 140 over the air interface to the antenna 136 of the second base station 21 and received at the TRX 135 of the second base station. Thereafter, the high frequency signal is converted by the down-converter 131 of the second BS to an IF signal, which IF signal is transmitted over the twisted pair wire 23 by the TX 133 of the second BS. Further, in the first base station, the IF signal is received at the RX 123 of the first BS and converted by the down-converter 121 to a low frequency signal which is transmitted by the TRX 125 to the base band unit 110.

According to embodiments, the first BS 11 in FIG. 2 may actually be a simplified BS having an aggregation and/or conversion unit, or similar, which only performs the step of converting the signal up and down between IF and low frequency, and possibly aggregating signals from different links connecting different first BSs to the second BS (which will be shown later). In other words, the functions of a BS to itself be transmitting and receiving signals over an air interface may be realized in another network node arranged separate from the simplified BS.

Figure 3:
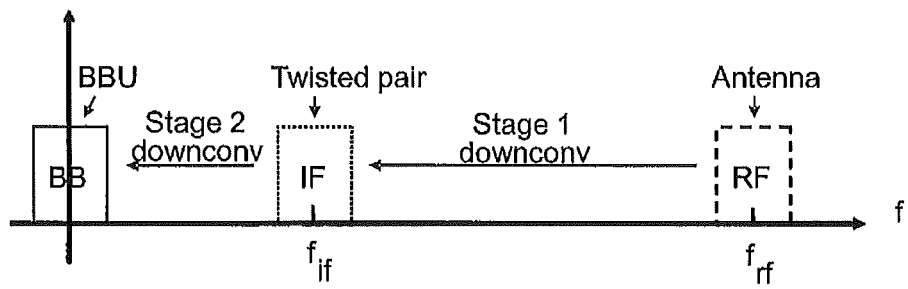
FIG. 3 is a graph illustrating down-conversion from RF to base band.

The conversion downlink from a high radio frequency (RF), to an IF and further to a low, base band, frequency (BB) is also shown in the graph of FIG. 3 illustrating the different frequencies in a frequency spectrum.

The low frequency may be the base band frequency (i.e. around 0 Hz). The intermediate frequency may be a frequency between 3.5-250 MHz. The selection of intermediate frequency may depend on the quality of the wire, the noise sources, the needed reach, the bandwidth, and the number of different IFs needed. The high frequency may be a typical UHF band (300 MHz-3 GHz) or higher.

Figure 4:
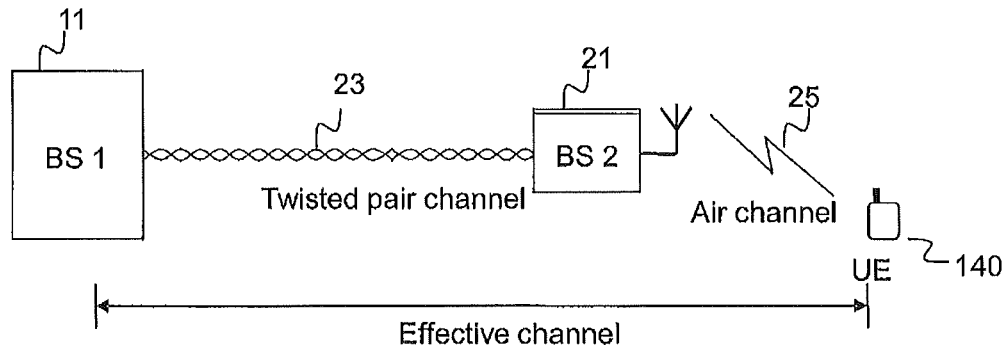
FIG. 4 is a schematic block diagram illustrating an effective channel comprising an air channel and a twisted pair wire channel for a mobile station connected to a heterogeneous network.

FIG. 4 describes an effective communication channel between a user equipment, UE, 140 over a first BS 21 to a second BS 11. The effective channel comprises a twisted pair channel 23, which is the connection between the first BS 11 and the second BS 21 over a twisted pair wire, and an air channel 25 which is the connection between the UE 140 and the second BS 21 over an air interface. For the twisted-pair channel, the longer the wire, the more dispersive is the channel. In other words, the longer the wire, the lower is the signal to noise ratio (SNR) of the twisted pair channel. If the twisted pair wire is kept short, SNR for the twisted pair channel is normally much higher than SNR for the air channel. In that case, the SNR of the effective channel is approximately the same as the SNR of the air channel. Although, the SNR over the twisted pair channel is, except for being influenced by the length of the wire, also influenced by the frequency. The higher the frequency, the lower the SNR.

Figure 5:
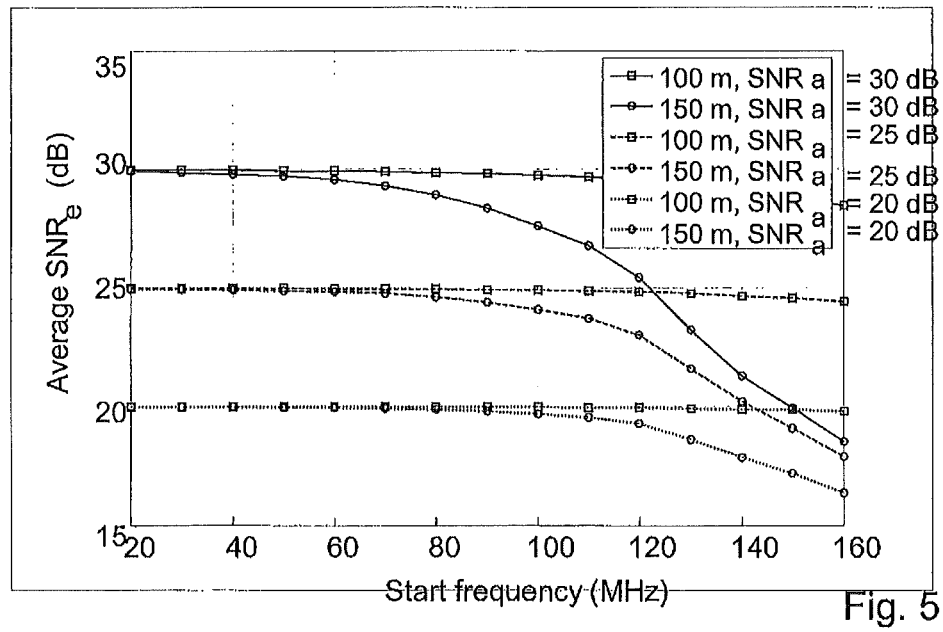
FIG. 5 is a graph illustrating average signal to noise ratio in relation to frequency for transmission over an effective channel as illustrated in FIG. 4.

In the graph of FIG. 5, the average SNR for an effective channel is shown for different frequencies used over the twisted pair wire, different lengths of the twisted pair wire and different air channel SNR ($SNR_a$). Basically, the graph shows that the SNR loss caused by a twisted pair channel increases as frequency increases and wire length increases. For a 100 meter wire length, the effective SNR drop over the twisted pair channel is small for all frequencies shown (20 to 160 MHz). For example, only 1.5 dB drop in the effective SNR is experienced for the frequency band 160-180 MHz. Although, for a 150 meter wire length, the SNR starts degrading for higher frequencies. This graph may illustrate the advantage of using an intermediate frequency instead of an RF frequency for transmitting signals over a twisted pair wire. In addition, this graph illustrates that a low IF may advantageously be used for transmitting signals over the twisted pair cable than using a high IF, especially if the wire is long.

Figure 6:
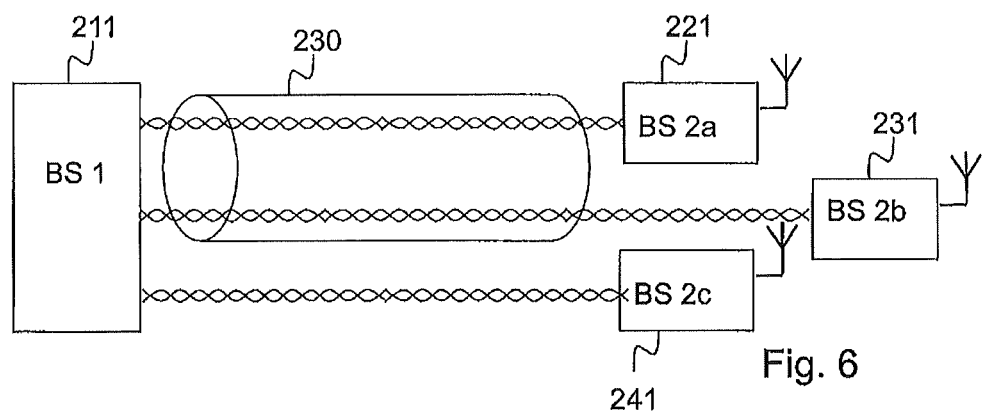
FIG. 6 is a schematic block diagram of a plurality of second BSs communicating with a first BS via separate twisted pair wires.

A first BS may be connected to a plurality of second BSs. Such a scenario is shown in FIG. 6, in which a first BS 211 is connected to three different second BSs: BS2*a* 221, BS2*b* 231 and BS2*c* 241. If the plurality of second base stations are connected to the first base station via communication channels using separate twisted pair wires that are arranged in separate cable binders, there is no or at least very little disturbance from transmission at a first twisted pair wire to transmission at another twisted pair wire. In this case the same frequency may be used for communication between the first base station and the plurality of second base stations. Although, as shown in FIG. 6, the second base stations BS2*a* 221 and BS2*b* 231 are connected to the first BS 211 via twisted pair wires using a common cable binder 230. When a common cable binder is used, cross talk between the twisted pair wires can significantly reduce the SNR on the twisted pair wires. Cross-talk can be in the shape of far end cross talk (FEXT) and near end cross talk (NEXT). Both FEXT and NEXT may reduce the SNR. As a conclusion, if it is detected that two separate communication channels use two separate twisted pair wires that are arranged in the same cable binder, different IF frequencies may be allocated for transmitting signals for separate communication channels using twisted pair wires arranged in the same cable binder.

Figure 7:
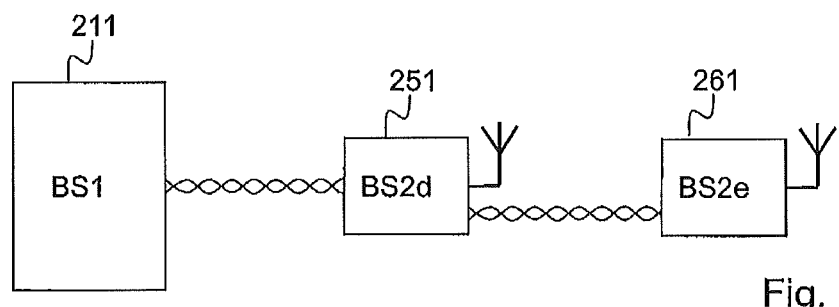
FIG. 7 is a schematic block diagram of BSs connected in a chain topology.

Another scenario is depicted in FIG. 7, in which the second BSs may be connected to the first BS in a chain topology. In other words, a second BS, BS2*e* 261 is connected to the first BS 211 via another second BS, BS2*d*, such that a first communication channel for communication between the BS2*d* and the first BS at least partly uses the same twisted pair wire as a second communication channel for communication between the BS2*e* and the first BS. I.e. signals from/to the BS2*d* and the BS2*e* may be multiplexed on the same wire.

In the cases where different communication channels communicate signals that are to be multiplexed on the same twisted pair wire, as illustrated in FIG. 7, and in the cases where twisted pair wires are arranged in the same cable binder, there is a need to allocate different frequencies for the communication channels used for communication between the different second BSs and the first BS.

Such a frequency allocation is preferably controlled by the first BS. According to an embodiment, the first BS estimates transmission quality for the different communication channels connecting the different second BSs with the first BS. Thereafter, the first BS allocates frequencies to the different communication channels such that a communication channel experiencing a lower transmission quality than another communication channel is allocated a lower intermediate frequency than the another communication channel. The transmission quality may be a detection of twisted pair wire conditions such as wire length, line attenuation, crosstalk level, noise level, number of cross talkers etc. By allocating lower IF frequencies to channels with lower transmission quality, a channel with lower quality will be allocated a frequency that normally has a higher SNR, (as shown in FIG. 5) which give a more even quality in total for a system.

According to another embodiment, the first BS detects that the twisted pair wires of a number of communication channels are arranged in the same cable binder, and allocates different frequencies to the number of communication channels that have twisted pair wires arranged in the same cable binder. Further, it may be detected that the twisted pair wires of a number of the communication channels are arranged in the same cable binder by detecting crosstalk level between the communication channels. Crosstalk level between two communication channels are high if the twisted pair wires are arranged in the same cable binder and much lower if the twisted pair wires are arranged in different cable binders.

According to an embodiment, frequencies may be allocated based on estimated twisted pair wire attenuation such that a communication channel experiencing high attenuation is allocated a lower intermediate frequency than a communication channel experiencing high attenuation. By not considering crosstalk level when allocating frequencies, complexity of frequency allocation is reduced. Twisted pair attenuation may be estimated based on e.g. length of the twisted pair wire, or by comparing received signal strength to transmitted signal strength. To reduce complexity at a first base station, the wire condition is estimated by the second base station, for example via a single-ended-line-test (SELT). The detection can also be done with one or multiple test bands, at which the first BSs send signals back to a second BS in a scheduled way.

Figure 8:
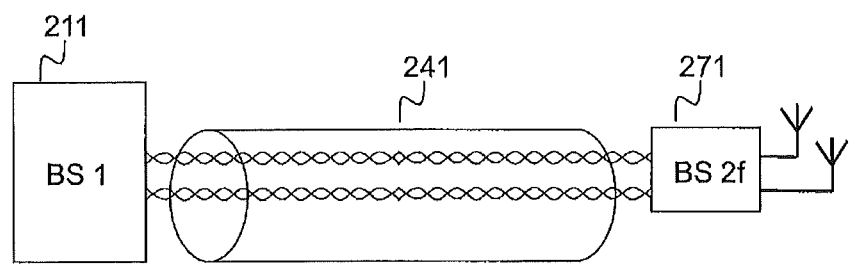
FIG. 8 is a schematic block diagram of a second BS having a plurality of antennas, each antenna being connected with the first BS via a twisted pair wire.

Nowadays, pico-cells for example are often equipped with multiple antennas to support Multiple Input Multiple Output (MIMO) transmission in radio systems. FIG. 8 shows an example of a base station BS2*f* 271 that has two antennas that are backhauled to the first base station 211 via one twisted pair wire each. The twisted pair wires may be arranged in a common cable binder 241. For MIMO transmissions, the same frequency band is used for the transmission over the air interface from each of the antennas towards UEs. In such a case there is cross talk in the air interface between the air channels received at the two antennas as well as cross talk between twisted pair wires arranged in the same cable binder. The cross talk between the antennas is normally much stronger than the possible cross talk between twisted pair wires. Since the MIMO transceiver already handles cross talk between air channels it may also handle additional cross talk between twisted pair channels. In other words, the cross talk between twisted pair channels is already compensated for by the MIMO transceiver when it compensates for air channel cross talk.

According to an embodiment, if it is detected that at a second BS 271 there are a plurality of antennas, and that communication over the air interface from/to the antennas use the same high frequency, and that communication from the different antennas of the second BS 271 towards the first BS 211 uses different twisted pair wires, it is suggested to allocate the same intermediate frequency to the separate twisted pair communication channels. Although, if there are fewer twisted pair wires than number of antennas, some of the twisted pair communication channels need to use the same twisted pair wire. In that case the communication over such a commonly used twisted pair wire needs to be frequency multiplexed, for example using Frequency Division Multiplexing (FDM) technology.

In a system such as the system of FIG. 2, the attenuation of IF signals transmitted over the twisted pair wire 23 increases with increased frequency. Consequently, an IF signal transmitted over a twisted pair wire is influenced in such a way that the received signal power spectrum density (PSD) decreases over frequency. Although, the radio signal PSD should preferably be flat to follow 3GPP requirements. If not, performance degradation may be caused at the receivers of the UEs and the first BSs. According to an embodiment, the frequency dependent attenuation over frequency over the twisted pair wire is detected and is compensated for such that the PSD becomes flat. For example, the frequency dependent attenuation over frequency may be detected by detecting the PSD slope of the received signal. Alternatively, the frequency dependent attenuation over the twisted pair wire may be detected out-of-band, e.g. based on extrapolation of attenuation estimates from other frequencies (e.g. opposite direction or special test signals).

According to an embodiment, for realizing the estimation and compensation of the frequency dependent attenuation, a PSD estimation unit and an adaptive filter may be implemented at the receiver of the first base station and/or the second base station. The PSD estimator estimates the slope of the received signal and feeds the estimate into the adaptive filter. The filter may be for example a digital filter or an analog filter. The adaptive filter then changes its filter properties to compensate for the slope. Such an algorithm may run periodically to be able to track any changes of the twisted pair wire characteristics due to for example changes of environmental temperature. The filter should preferably adapt the PSD slope in the frequency domain such that the output signal power is maintained substantially equal to the input signal power.

According to another embodiment, a management and control channel is defined for frequency allocation communication between the first BS and the plurality of second BSs. According to an example, the management and control channel may use a low frequency (out-of-band) channel over the twisted pair wire. For such a low frequency channel, Digital Subscriber Line (DSL) technology (e.g. Asymmetric DSL (ADSL) or Very high rate DSL (VDSL)) can be used, as these technologies support both one pair and multi-pair operations. SELT functionalities built-in in DSL technologies can be used for loop condition detection. IF any IP backhaul is needed for WIFI and/or any other radio systems, this channel can also be used for IP backhauling. In addition to DSL, Ethernet-based technologies supporting one-pair operation may be used. The mentioned technologies work in a lower frequency band than the IF band and will thereby not interfere in the radio-over-twisted pair wire spectrum. According to another example, the management and control channel may use a wireless channel. The second BSs, e.g. a pico BS, may be equipped with other wireless capabilities (WIFI, microwave) for backhauling or data transport. These channels can then also be used for transporting management and control data.

Further, frequency synchronization may be needed for up/down conversion operations. The clock in the second BSs need to be synchronized with the clock in the first BS. This can be accomplished by transmitting a narrow band (out-of-band) clock signal from the first BS to the second BSs. Alternatively, this can be accomplished by transporting a synchronization signal or information over the management and control channel, which can be accomplished through a wired channel or a wireless channel as described above for the management and control channel.

Figure 9:
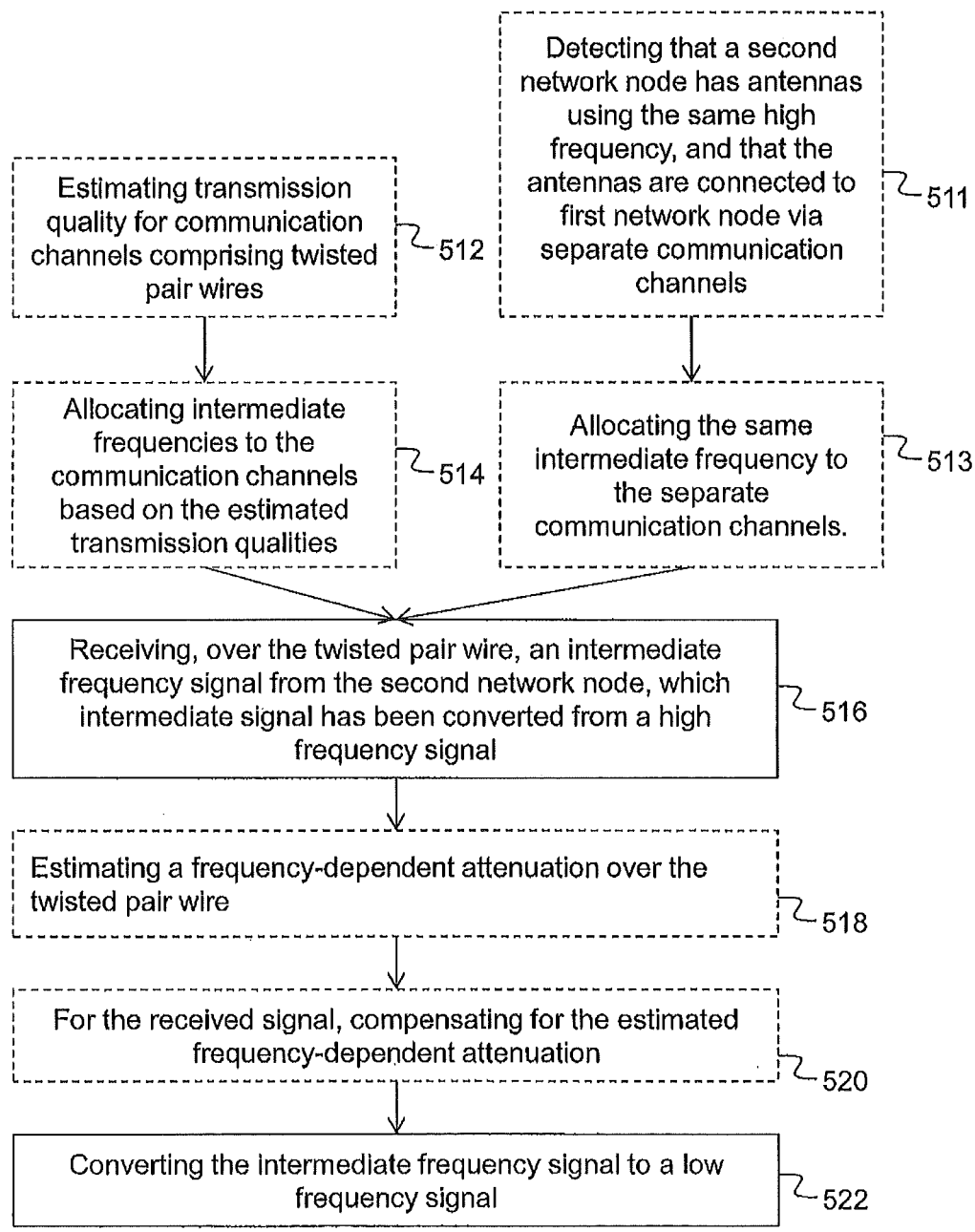
FIG. 9 is a flow chart of a method in a first network node for providing communication in an uplink direction according to an embodiment.

In FIG. 9, a method performed by a first network node 11 of a cellular system is shown providing communication in an uplink direction between the first network node 11 and a second network node 21 over a communication channel comprising a twisted pair wire 23. The method comprises receiving 516, over the communication channel comprising the twisted pair wire, an intermediate frequency signal from the second network node, which intermediate frequency signal has been converted by the second network node from a high frequency signal having a frequency higher than the frequency of the intermediate frequency signal, and converting 522 the intermediate frequency signal to a low frequency signal having a frequency lower than the frequency of the intermediate frequency signal.

According to an embodiment (see also FIG. 6), the first network node 11 is arranged to receive intermediate frequency signals from a plurality of second network nodes 221, 231, 241 over separate communication channels comprising twisted pair wires, each of the communication channels connecting one of the plurality of second network nodes with the first network node. In this embodiment, the method may comprise estimating 512 transmission quality for the communication channels, and allocating 514 intermediate frequencies to the communication channels based on the estimated transmission qualities such that a first of the communication channels having a first estimated transmission quality is allocated a lower intermediate frequency than a second of the communication channels having a second estimated transmission quality higher than the first estimated transmission quality.

By allocating frequencies such that a communication channel having worse transmission quality than another communication channel is allocated a lower intermediate frequency than the another communication channel, a better SNR may be achieved for the communication channels experiencing worse transmission quality. Also, a more even transmission quality may be achieved for different communication channels.

Information of the allocated intermediate frequencies may then be transmitted by the first base station to each of the second base stations, which second base stations are instructed to convert a high frequency signal to be transmitted to the first base station into an intermediate frequency signal with the allocated frequency and to transmit the intermediate frequency signal according to the allocated frequency. The intermediate frequency signals received at the first base station are then received 516 at the allocated intermediate frequency for each communication channel, and the received intermediate signals are converted 522 to low frequency signals.

According to an embodiment, the first network node 11 is a radio base station of a type covering a large geographical area for communication with a second network node 21, which is a radio base station of a type covering a geographical area smaller than the large geographical area.

According to another embodiment, the method further comprises detecting that the twisted pair wires of a number of the communication channels are arranged in the same cable binder, and only allocating 514 different intermediate frequencies to the number of communication channels that have twisted pair wires arranged in the same cable binder. Further, it may be detected that the twisted pair wires of a number of the communication channels are arranged in the same cable binder by detecting crosstalk level between the communication channels.

According to yet another embodiment, the method further comprises estimating 518 a frequency-dependent attenuation over the twisted pair wire, and for the received signal, compensating 520 for the estimated frequency-dependent attenuation. To estimate 518 a frequency-dependent attenuation over the twisted pair wire may be accomplished by estimating a power spectrum density, PSD, slope over frequency for the received intermediate frequency signal. The estimated slope may be compensated 520 by adapting properties of an adaptive filter through which the received intermediate frequency is fed.

According to yet another embodiment, the method further comprises detecting 511 that a second network node has a plurality of antennas using the same high frequency, and wherein each of the plurality of antennas are connected to the first network node via a separate communication channel each channel comprising a twisted pair wire, and allocating 513 the same intermediate frequency to the separate communication channels. Thereby, the same intermediate frequency may be reused, which saves bandwidth for other (backhauling) communication links.

Figure 10:
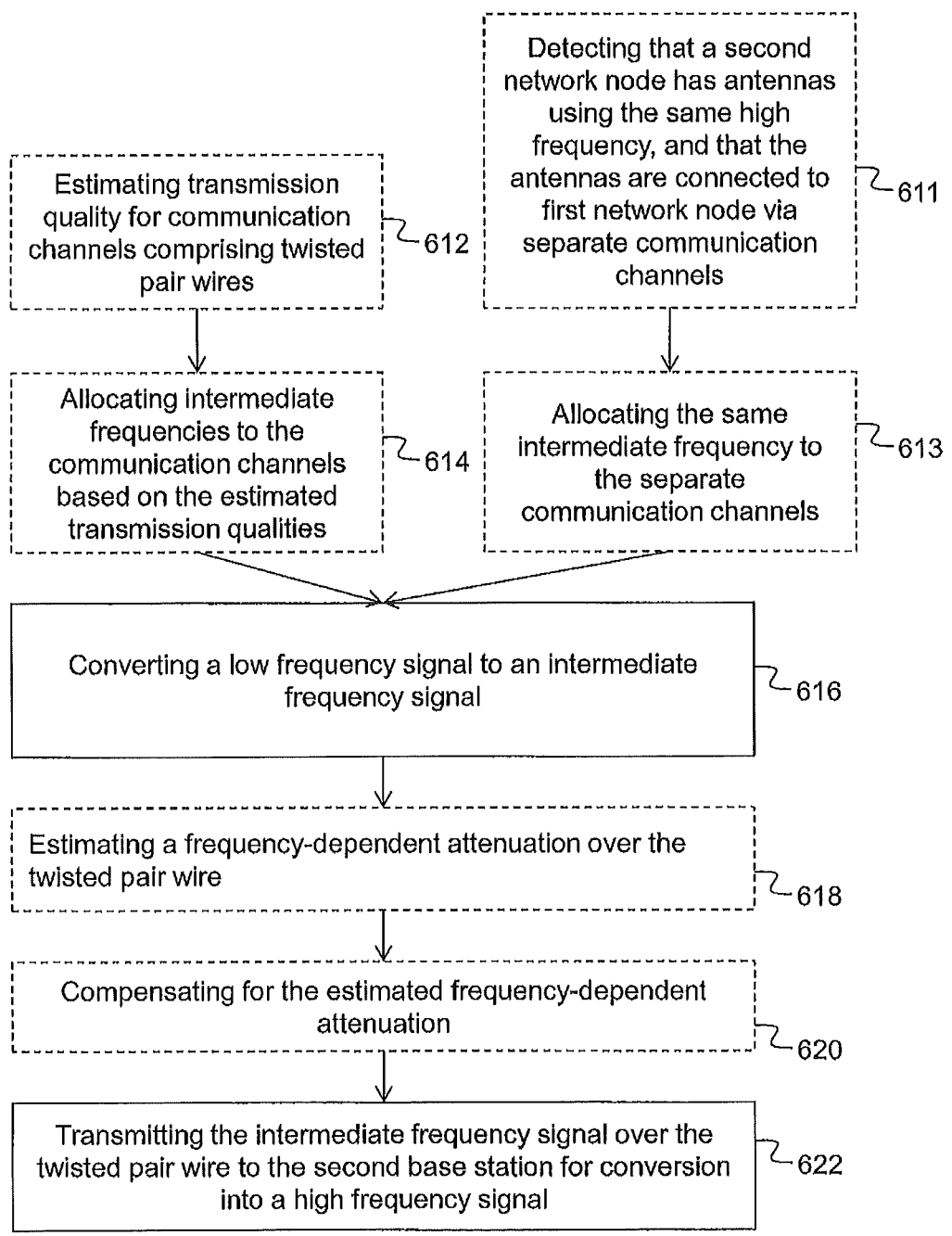
FIG. 10 is a flow chart of a method in a first network node for providing communication in a downlink direction according to an embodiment.

In FIG. 10, a method performed by a first network node 11 of a cellular system is shown providing communication in a downlink direction between the first network node 11 and a second network node 21 over a twisted pair wire 23. The method comprises converting 616 a received low frequency signal to an intermediate frequency signal having a frequency higher than the frequency of the low frequency signal, and transmitting 622, over the communication channel comprising the twisted pair wire 23, the intermediate frequency signal to the second network node for subsequent conversion at the second network node into a high frequency signal having a frequency higher than the frequency of the intermediate frequency signal.

According to an embodiment (see also FIG. 6), the first network node 11 is arranged to transmit intermediate frequency signals to a plurality of second network nodes 221, 231, 241 over separate communication channels comprising twisted pair wires, each of the communication channels connecting one of the plurality of second network nodes with the first network node. In this embodiment, the method may comprise estimating 612 transmission quality for the communication channels comprising twisted pair wires, and allocating 614 intermediate frequencies to the communication channels based on the estimated transmission qualities such that a first of the communication channels having a first estimated transmission quality is allocated a lower intermediate frequency than a second of the communication channels having a second estimated transmission quality higher than the first estimated transmission quality. Thereafter, the low frequency signal is converted 616 to the intermediate frequency signal with a frequency as allocated for the communication channel, and the intermediate frequency signal is transmitted 622 to the second network node at the allocated intermediate frequency.

According to another embodiment, the method further comprises detecting that the twisted pair wires of a number of the communication channels are arranged in the same cable binder, and only allocating 614 different intermediate frequencies to the number of communication channels that have twisted pair wires arranged in the same cable binder. Further, it may be detected that the twisted pair wires of a number of the communication channels are arranged in the same cable binder by detecting crosstalk level between the communication channels.

According to yet another embodiment, the method further comprises estimating 618 a frequency-dependent attenuation over the twisted pair wire, and for the received signal, compensating 620 for the estimated frequency-dependent attenuation. To estimate 618 a frequency-dependent attenuation over the twisted pair wire may be accomplished by estimating a power spectrum density, PSD, slope over frequency for the received intermediate frequency signal. The estimated slope may be compensated 620 by adapting properties of an adaptive filter through which the received intermediate frequency is fed.

According to yet another embodiment, the method further comprises detecting 611 that a second network node has a plurality of antennas using the same high frequency, and wherein each of the plurality of antennas are connected to the first network node via a separate communication channel, each communication channel comprising a twisted pair wire, and allocating 613 the same intermediate frequency to the separate communication channels. Thereby, the same intermediate frequency may be reused, which saves bandwidth for other (backhauling) communication links.

Figure 11:
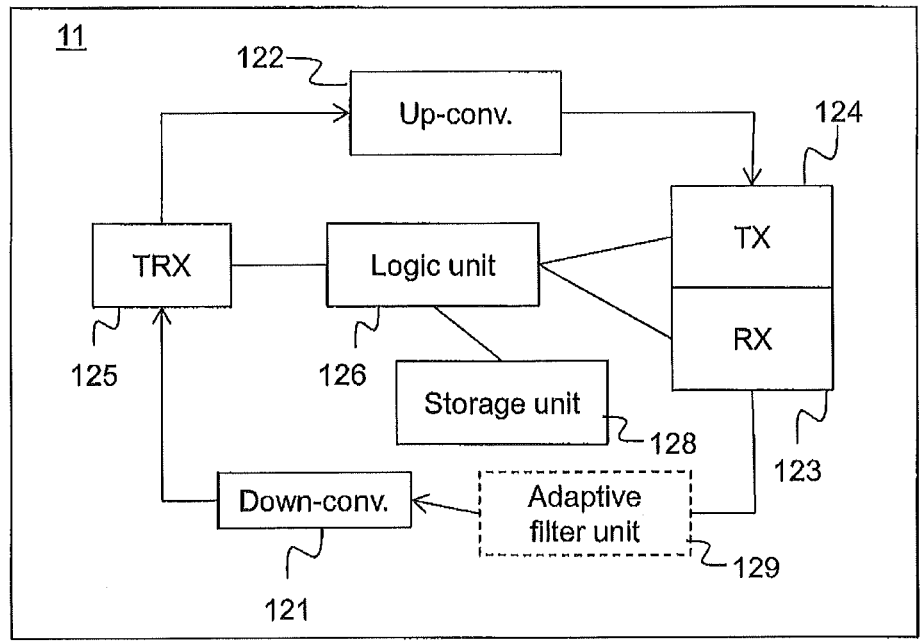
FIG. 11 is a schematic block diagram of a first network node according to an embodiment.

FIG. 11 shows a first network node 11 in more detail. In addition to the devices already presented in FIG. 2, the first network node 11 also comprises a logic unit 126 and a storage unit 128. The logic unit 128 may be a processor.

According to an embodiment, the first network node is arranged in a cellular system for communication with a second network node over a twisted pair wire. The first network node comprises a receiver 123 for receiving, over the twisted pair wire, an intermediate frequency signal from the second network node, which intermediate frequency signal has been converted from a high frequency signal having a frequency higher than the frequency of the intermediate frequency signal by the second network node. The first network node also comprises a down-converter 121 for converting the intermediate frequency signal to a low frequency signal having a frequency lower than the frequency of the intermediate frequency signal, an up-converter 122 for converting a received low frequency signal to an intermediate frequency signal having a frequency higher than the frequency of the low frequency signal, and a transmitter 124 for transmitting, over the twisted pair wire, the intermediate frequency signal to the second network node for subsequent conversion into a high frequency signal with a frequency higher than the frequency of the intermediate frequency signal at the second network node.

According to another embodiment, the transmitter 124 is arranged to transmit, and the receiver 123 is arranged to receive, intermediate frequency signals to/from a plurality of second network nodes 221, 231, 241 (see FIG. 6) over separate communication channels comprising twisted pair wires, each of the communication channels connecting one of the plurality of second network nodes with the first network node. Further the logic unit 126 of the first network node is arranged for estimating transmission quality for the communication channels; and allocating intermediate frequencies to the communication channels based on the estimated transmission qualities such that a first of the communication channels having a first estimated transmission quality is allocated a lower intermediate frequency than a second of the communication channels having a second estimated transmission quality higher than the first estimated transmission quality.

According to yet another embodiment, the logic unit 126 is further arranged for detecting that the twisted pair wires of a number of the communication channels are arranged in the same cable binder, and only allocating different intermediate frequencies to the number of communication channels that have twisted pair wires arranged in the same cable binder.

According to still another embodiment, the logic unit 126 is arranged for detecting detected that the twisted pair wires of a number of the communication channels are arranged in the same cable binder by detecting crosstalk level between the communication channels.

According to yet another embodiment, the logic unit 126 is further arranged for detecting that a second network node has a plurality of antennas using the same high frequency, and wherein each of the plurality of antennas are connected to the first network node via a separate communication channel each channel comprising a twisted pair wire, and allocating the same intermediate frequency to the separate communication channels.

According to another embodiment, the logic unit 126 is further arranged for estimating a frequency-dependent attenuation over the twisted pair wire, and, for the received intermediate signal, compensating for the estimated frequency-dependent attenuation. Further, the logic unit 126 may be arranged for estimating a frequency-dependent attenuation over the twisted pair wire by estimating a power spectrum density, PSD, slope over frequency for the received intermediate frequency signal. A PSD estimating unit arranged in the logic unit, or as a separate unit may be arranged to estimate a slope over frequency of a received signal, and feed the result of the estimation to an adaptive filter unit 129 that adapts its filter properties, e.g. filter coefficients, to compensate for the estimated slope. The adaptive filter unit 129 may be arranged such that the received intermediate frequency signal is fed through the filter unit, e.g. between the receiver 123 and the down-converter 121. According to an alternative embodiment, the logic unit 126 may be arranged for estimating and compensating a frequency-dependent attenuation over the twisted pair wire at the transmitter side. I.e. in this case a pre-compensation is performed on a signal to be transmitted. The pre-compensation may, at the first network node, be realized as a pre-compensation unit, e.g. an adaptive filter unit, connected between the up-converter 122 and the transmitter 124. Further, the logic unit may be arranged for estimating the attenuation over the twisted pair wire, for signals sent from the first network node to the second network node, and for setting filter properties of the pre-compensation unit according to the estimated attenuation.

The storage unit 128 of the first network node may be connected to the logic unit 126. The storage unit may be arranged for storing results of the embodiment methods, for example storing frequency allocation schemes, estimated transmission qualities etc.

Figure 12:
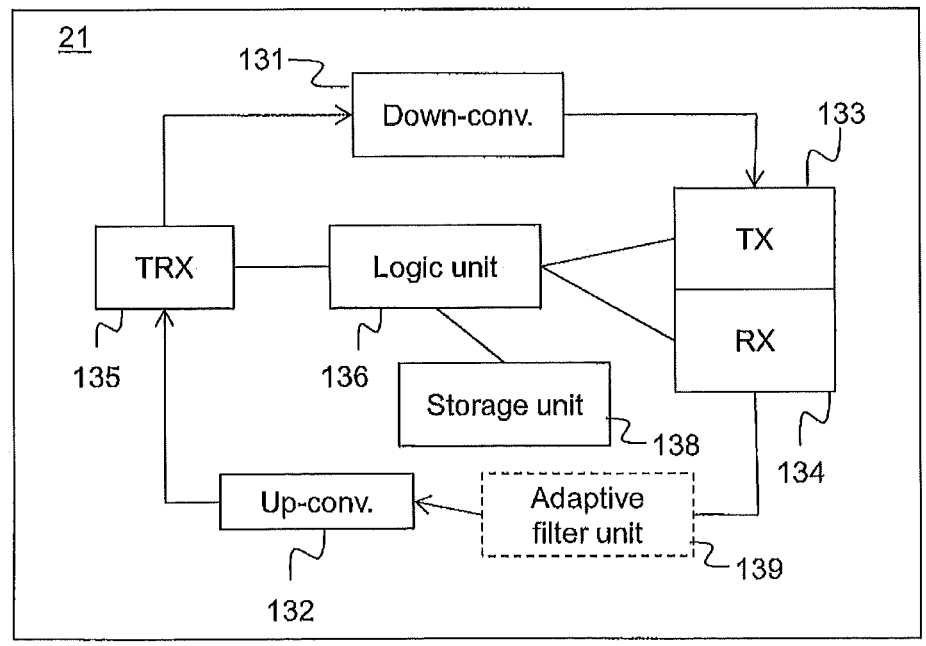
FIG. 12 is a schematic block diagram of a second network node according to an embodiment.

FIG. 12 describes a second network node 21 according to an embodiment. Except for the entities described in relation to FIG. 2, the second network node may comprise a logic unit 136 for e.g. ensuring that the other entities of the second network node acts according to instructions received from the first network node, and a storage unit 138 for e.g. storing received instructions.

The logic unit 136 of the second network node 21 may further be arranged for estimating a frequency-dependent attenuation over the twisted pair wire, and, for the received intermediate signal, received from the first network node, compensating for the estimated frequency-dependent attenuation. Further, the logic unit 136 may be arranged for estimating a frequency-dependent attenuation over the twisted pair wire by estimating a power spectrum density, PSD, slope over frequency for the received intermediate frequency signal. A PSD estimating unit arranged in the logic unit, or as a separate unit, may be arranged to estimate a slope over frequency of a received signal, and feed the result of the estimation to an adaptive filter unit 139 that adapts its filter properties, e.g. filter coefficients, to compensate for the estimated slope. The adaptive filter unit 139 may be arranged such that the received intermediate frequency signal is fed through the filter unit, e.g. between the receiver 134 and the up-converter 132. According to an alternative embodiment, the logic unit 136 of the second network node 21 may be arranged for estimating and compensating a frequency-dependent attenuation over the twisted pair wire at the transmitter side. I.e. in this case a pre-compensation is performed on a signal to be transmitted. The pre-compensation may, at the second network node, be realized as a pre-compensation unit, e.g. an adaptive filter unit, connected between the down-converter 131 and the transmitter 133. Further, the logic unit may be arranged for estimating the attenuation over the twisted pair wire, for signals sent from the second network node to the first network node, and for setting filter properties of the pre-compensation unit according to the estimated attenuation.

Figure 13:
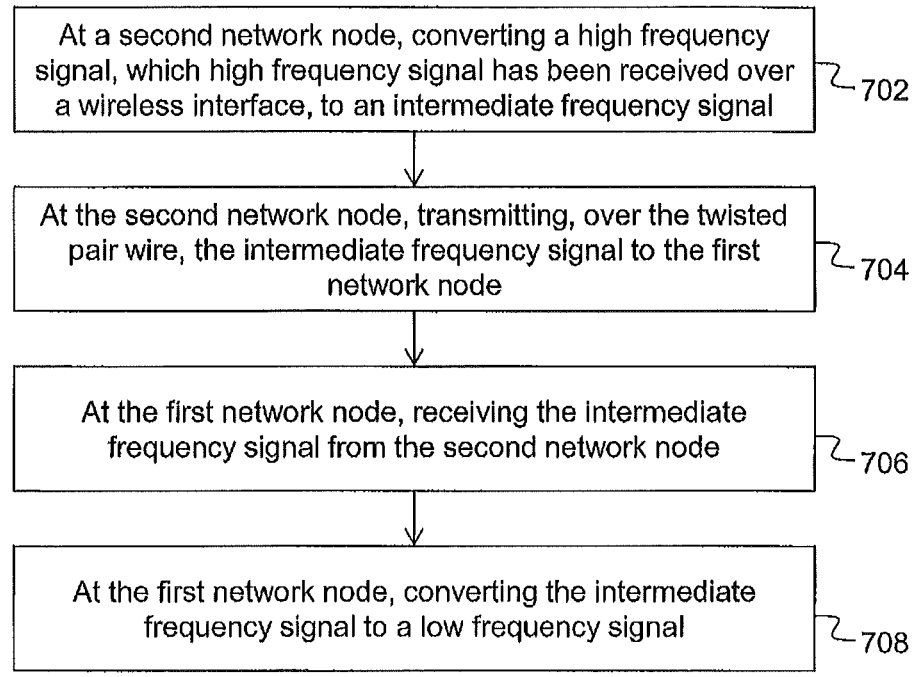
FIG. 13 is a flow chart of method in a cellular system for providing communication in an uplink direction.

FIG. 13 describes a method in a cellular system for communication between a first network node 11 and a second network node 21 over a twisted pair wire 23, according to an embodiment. The method describes uplink communication between a second network node and a first network node. The method comprises at the second network node 21, converting 702 a high frequency signal, which high frequency signal has been received over a wireless interface, to an intermediate frequency signal having a frequency lower than the frequency of the high frequency signal, and transmitting 704, over the twisted pair wire, the intermediate frequency signal to the first network node. The method further comprises at the first network node 11, receiving 706 the intermediate frequency signal from the second network node, and converting 708 the received intermediate frequency signal to a low frequency signal having a frequency lower than the frequency of the intermediate frequency signal.

Figure 14:
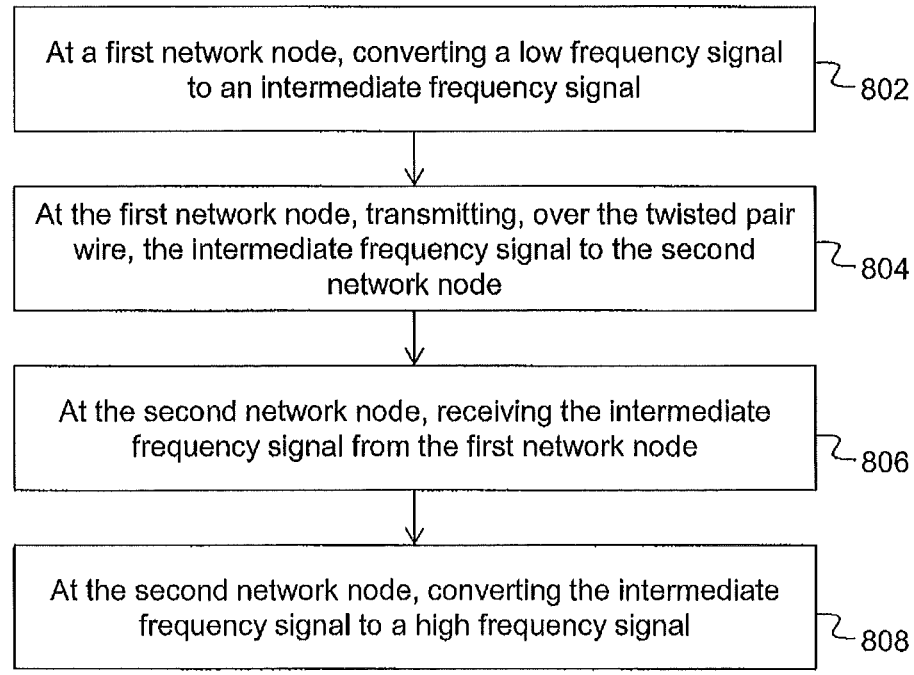
FIG. 14 is a flow chart of method in a cellular system for providing communication in a downlink direction.

FIG. 14 describes a method in a cellular system for communication between a first network node 11 and a second network node 21 over a twisted pair wire 23, according to an embodiment. The method describes downlink communication between a second network node and a first network node. The method comprises at the first network node 11, converting 802 a received low frequency signal to an intermediate frequency signal having a frequency higher than the frequency of the low frequency signal, and transmitting 804, over the twisted pair wire, the intermediate frequency signal to the second network node. The method further comprises at the second network node 21, receiving 806 the intermediate frequency signal from the first network node, and converting 808 the received intermediate frequency signal to a high frequency signal having a frequency higher than the frequency of the intermediate frequency signal.

Turning back to FIG. 2, an embodiment describes a cellular system comprising a first network node 11 and a second network node 21. The cellular system is arranged for communication between the first network node and the second network node over a twisted pair wire 23. The first network node 11 comprises a receiver 123 for receiving, over the twisted pair wire, an intermediate frequency signal from the second network node and a down-converter 121 for converting the received intermediate frequency signal to a low frequency signal having a frequency lower than the frequency of the intermediate frequency signal. The first network node further comprises an up-converter 122 for converting a low frequency signal to an intermediate frequency signal having a frequency higher than the frequency of the low frequency signal, and a transmitter 124 for transmitting, over the twisted pair wire, the intermediate frequency signal to the second network node. The second network node 21 comprises a receiver 134 for receiving, over the twisted pair wire, an intermediate frequency signal from the first network node and an up-converter 132 for converting the received intermediate frequency signal to a high frequency signal having a frequency higher than the frequency of the low frequency signal. The second network node further comprises a down-converter 131 for converting a high frequency signal to an intermediate frequency signal having a frequency lower than the frequency of the high frequency signal, and a transmitter 133 for transmitting, over the twisted pair wire, the intermediate frequency signal to the second network node.

Although the description in some situations discusses pico BSs communicating with a macro BS, the solution described may be applicable to any kind of BS of a first type covering a small geographical area communicating with a BS of a second type covering a geographical area that is larger than the small geographical area covered by the BS of the first type. For example, the first type of BS may be a micro BS communicating with a second type of BS being a macro BS. As another example, the first type of BS may be a femto BS communicating with a second type of BS being a pico BS or a micro BS or a macro BS.

Figure 15:
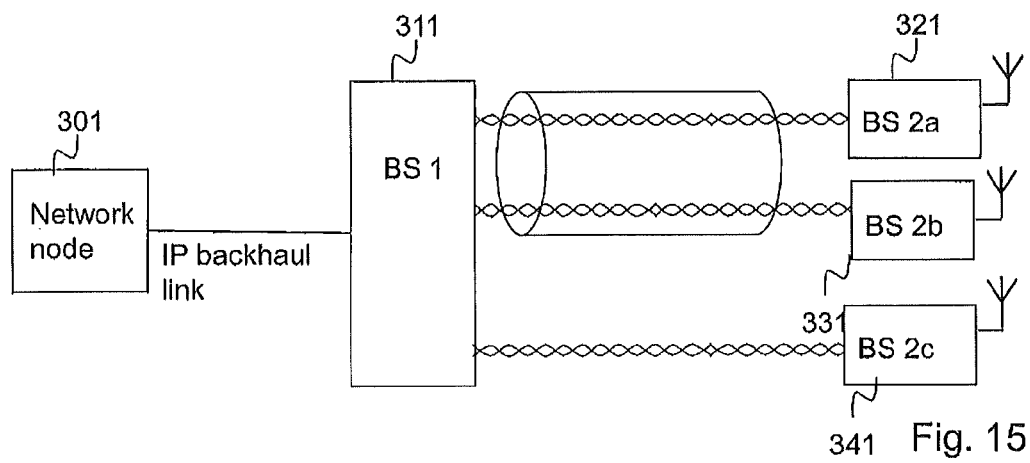
FIG. 15 is a schematic block diagram of a network architecture according to an embodiment.

Further, in the above scenarios a first base station is communicating with one or more second base station. It is also possible that a twisted pair wire does not go all the way from the second BS to the first BS. FIG. 15 shows a scenario where the IF signals sent from a number of second BSs 321, 331, 341 over twisted pair wires are terminated at a centralized BS1 311. The centralized BS1 311 is then connected to the core network via an IP backhaul link and a network node 301 such as a macro RBS. The second BSs 321, 331, 341 can then be fully coordinated by the centralized BS 311 but the lower level coordination between a macro BS and the second BSs 321, 331, 341 (which may be pico BSs) can be done via the IP backhaul link. Note that in this case the BS1 is not a macro RBS.

Figure 16:
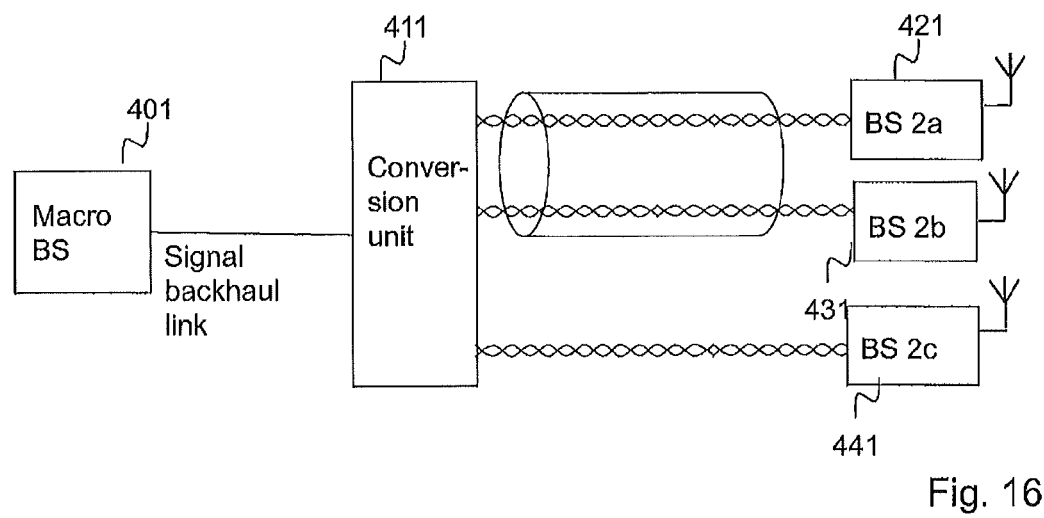
FIG. 16 is a schematic block diagram of another network architecture according to another embodiment.

FIG. 16 shows another scenario where the IF signals sent from a number of second BSs 421, 431, 441 are terminated at a conversion unit 411. The conversion unit is arranged to convert the signals into base band. The conversion unit 411 may also be arranged to aggregate information from many links into fewer links, in this case one signal backhaul link, such as CPRI or a fiber link, which connects the conversion unit 411 with a macro BS 401 or a centralized BS.

The twisted pair wire may be made from copper.

While the solution has been described with reference to specific exemplary embodiments, the description is generally only intended to illustrate the inventive concept and should not be taken as limiting the scope of the solution. The solution is defined by the appended claims.

The invention claimed is:

1. A method performed by a first radio base station of a cellular system for communication between the first radio base station and a second radio base station over a communication channel comprising a twisted pair wire, the method comprising:
   receiving, by the first radio base station over the twisted pair wire, an intermediate frequency signal from the second radio base station, which intermediate frequency signal has been converted by the second radio base station from a high frequency signal having a frequency higher than a frequency of the intermediate frequency signal; and
   converting, by the first radio base station, the intermediate frequency signal to a low frequency signal having a frequency lower than the frequency of the intermediate frequency signal;
   wherein the first radio base station is of a type covering a large geographical area for communication with the second radio base station, which is of a type covering a geographical area smaller than the large geographical area.

2. The method according to claim 1, comprising:
   detecting that the second radio base station has a plurality of antennas using a same high frequency, wherein each of the plurality of antennas is connected to the first radio base station by a separate communication channel, each separate communication channel comprising a twisted pair wire; and
   allocating the same intermediate frequency to the separate communication channels.

3. The method according to claim 1, further comprising:
   estimating a frequency-dependent attenuation over the twisted pair wire; and
   for the received intermediate frequency signal, compensating for the estimated frequency-dependent attenuation.

4. A method performed by a first network node of a cellular system for communication between the first network node and a second network node over a communication channel comprising a twisted pair wire, and wherein the second network node comprises one among a plurality of second network nodes that are connected to the first network node by respective twisted pair wires, the method comprising:
   receiving, by the first network node over the twisted pair wire, an intermediate frequency signal from the second network node, which intermediate frequency signal has been converted by the second network node from a high frequency signal having a frequency higher than a frequency of the intermediate frequency signal wherein the first network node is configured to transmit/receive respective intermediate frequency signals to/from the plurality of second network nodes over separate communication channels comprising the respective twisted pair wires;
   converting, by the first network node, the intermediate frequency signal to a low frequency signal having a frequency lower than the frequency of the intermediate frequency signal;
   estimating respective transmission qualities for the communication channels; and
   allocating intermediate frequencies to the communication channels based on the estimated transmission qualities such that a first of the communication channels having a first estimated transmission quality is allocated a lower intermediate frequency than a second of the communication channels having a second estimated transmission quality higher than the first estimated transmission quality.

5. The method according to claim 4, the method further comprising:
   detecting that the twisted pair wires of two or more of the communication channels are arranged in the same cable binder; and
   allocating different intermediate frequencies to the two or more of the communication channels that have twisted pair wires arranged in the same cable binder.

6. The method according to claim 5, wherein detecting that the twisted pair wires of the two or more of the communication channels are arranged in the same cable binder comprises detecting a crosstalk level between the communication channels.

7. The method of claim 5, further comprising allocating a same intermediate frequency to a plurality of the communication channels that are in different cable binders.

8. A method performed by a first network node of a cellular system for communication between the first network node and a second network node over a communication channel comprising a twisted pair wire, the method comprising:

receiving, by the first network node over the twisted pair wire, an intermediate frequency signal from the second network node, which intermediate frequency signal has been converted by the second network node from a high frequency signal having a frequency higher than a frequency of the intermediate frequency signal;

converting, by the first network node, the intermediate frequency signal to a low frequency signal having a frequency lower than the frequency of the intermediate frequency signal;

estimating a frequency-dependent attenuation over the twisted pair wire, wherein estimating a frequency-dependent attenuation over the twisted pair wire comprises estimating a power spectrum density (PSD) slope over a plurality of frequencies; and for the received intermediate frequency signal, compensating for the estimated frequency-dependent attenuation.

9. The method according to claim 8, wherein the estimated PSD slope is compensated by adapting properties of an adaptive filter through which the received intermediate frequency signal is fed.

10. A method performed by a first network node of a cellular system for communication between the first network node and a second network node over a communication channel comprising a twisted pair wire, the method comprising:

converting, by the first network node, a received low frequency signal to an intermediate frequency signal having a frequency higher than a frequency of the low frequency signal; and transmitting, by the first network node over the communication channel comprising the twisted pair wire, the intermediate frequency signal to the second network node for subsequent conversion at the second network node into a high frequency radio signal having a frequency higher than the frequency of the intermediate frequency signal, wherein the high frequency radio signal is used for transmission over an air interface.

11. A first radio base station of a cellular system for communication with a second radio base station over a twisted pair wire, the first radio base station comprising:

a receiver configured to receive, by the first radio base station over the twisted pair wire, an intermediate frequency signal from the second radio base station, which received intermediate frequency signal has been converted from a high frequency signal having a frequency higher than a frequency of the received intermediate frequency signal by the second radio base station, a down-converter configured to convert, by the first radio base station, the received intermediate frequency signal to a low frequency signal having a frequency lower than the frequency of the intermediate frequency signal;

an up-converter configured to convert, by the first radio base station, a received low frequency signal to an intermediate frequency signal having a frequency higher than a frequency of the received low frequency signal; and a transmitter for transmitting, by the first radio base station over the twisted pair wire, the intermediate frequency signal to the second radio base station for subsequent conversion into a high frequency signal with a frequency higher than the frequency of the intermediate frequency signal at the second radio base station;

wherein the first radio base station is of a type covering a large geographical area for communication with the second radio base station, which is of a type covering a geographical area smaller than the large geographical area.

12. The first network node according to claim 11, wherein the receiver is configured to estimate a frequency-dependent attenuation over the twisted pair wire, and for the received intermediate frequency signal, to compensate for the estimated frequency-dependent attenuation, wherein estimating a frequency-dependent attenuation over the twisted pair wire comprises estimating a power spectrum density (PSD) slope over a plurality of frequencies.

13. A first network node of a cellular system for communication with a second network node over a twisted pair wire, wherein the second network node comprises one among a plurality of second network nodes that are connected to the first network node by respective twisted pair wires, the first network node comprising:

a receiver configured to receive, by the first network node over the twisted pair wire, an intermediate frequency signal from the second network node, which received intermediate frequency signal has been converted from a high frequency signal having a frequency higher than a frequency of the received intermediate frequency signal by the second network node, a down-converter configured to convert, by the first network node, the received intermediate frequency signal to a low frequency signal having a frequency lower than the frequency of the intermediate frequency signal;

an up-converter configured to convert, by the first network node, a received low frequency signal to an intermediate frequency signal having a frequency higher than a frequency of the received low frequency signal; and a transmitter configured to transmit, over the twisted pair wire, the intermediate frequency signal to the second network node for subsequent conversion into a high frequency signal with a frequency higher than the frequency of the intermediate frequency signal at the second network node, wherein the transmitter is configured to transmit, and the receiver is configured to receive, respective intermediate frequency signals to/from the plurality of second network nodes over separate communication channels comprising the respective twisted pair wires;

a processor configured to estimate respective transmission qualities for the communication channels, and to allocate intermediate frequencies to the communication channels based on the estimated transmission qualities such that a first of the communication channels having a first estimated transmission quality is allocated a lower intermediate frequency than a second of the communication channels having a second estimated transmission quality higher than the first estimated transmission quality.

14. The first network node according to claim 13, wherein the processor is further configured to detect that the twisted pair wires of two or more of the communication channels are arranged in the same cable binder, and further configured to allocate different intermediate frequencies to the two or more of the communication channels that have twisted pair wires arranged in the same cable binder.

15. The first network node according to claim 14, wherein the processor is configured to detect that the twisted pair wires of the two or more of the communication channels are arranged in the same cable binder by detecting a crosstalk level between the communication channels.

16. The first network node according to claim 13, wherein the processor is further configured to detect that the second network node has a plurality of antennas using a same high frequency, wherein each of the plurality of antennas is connected to the first network node by a separate communication channel, each separate communication channel comprising a twisted pair wire, and wherein the processor is further configured to allocate the same intermediate frequency to the separate communication channels.

17. The first network node according to claim 13, wherein the processor is further configured to estimate a frequency-dependent attenuation over the twisted pair wire, and further configured to, for the received intermediate frequency signal, compensate for the estimated frequency-dependent attenuation.

18. A first network node of a cellular system for communication with a second network node over a twisted pair wire, the first network node comprising:
a receiver configured to receive, by the first network node over the twisted pair wire, an intermediate frequency signal from the second network node, which received intermediate frequency signal has been converted from a high frequency signal having a frequency higher than a frequency of the received intermediate frequency signal by the second network node,
a down-converter configured to convert, by the first network node, the received intermediate frequency signal to a low frequency signal having a frequency lower than the frequency of the intermediate frequency signal;
an up-converter configured to convert, by the first network node, a received low frequency signal to an intermediate frequency signal having a frequency higher than a frequency of the received low frequency signal; and
a transmitter configured to transmit, by over the twisted pair wire, the intermediate frequency signal to the second network node for subsequent conversion into a high frequency signal with a frequency higher than the frequency of the intermediate frequency signal at the second network node; and
a processor configured to estimate a frequency-dependent attenuation over the twisted pair wire by estimating a power spectrum density (PSD) slope over a plurality of frequencies, and further configured to, for the received intermediate frequency signal, compensate for the estimated frequency-dependent attenuation.

19. The first network node according to claim 18, further comprising:
an adaptive filter configured such that the received intermediate frequency signal is fed through the filter, and wherein the estimated PSD slope is compensated by adapting properties of the adaptive filter according to the estimated PSD slope.

20. A method in a cellular system for communication between a first radio base station and a second radio base station over a twisted pair wire, the method comprising:
at the second radio base station,
converting a high frequency signal, which high frequency signal has been received over a wireless interface, to an intermediate frequency signal having a frequency lower than a frequency of the high frequency signal, and
transmitting, over the twisted pair wire, the intermediate frequency signal to the first radio base station; and at the first radio base station,
receiving the intermediate frequency signal from the second radio base station, and
converting the received intermediate frequency signal to a low frequency signal having a frequency lower than the frequency of the intermediate frequency signal;
wherein the first radio base station is of a type covering a large geographical area for communication with the second radio base station, which is of a type covering a geographical area smaller than the large geographical area.

21. The method according to claim 20, further comprising:
estimating, at the second network node, a frequency-dependent attenuation over the twisted pair wire; and
for the received intermediate frequency signal, compensating, at the second network node for the estimated frequency-dependent attenuation;
wherein estimating a frequency-dependent attenuation over the twisted pair wire comprises estimating a power spectrum density (PSD) slope over a plurality of frequencies.

22. A method in a cellular system for communication between a first network node and a second network node over a twisted pair wire, the method comprising:
at the first network node,
converting a received low frequency signal to an intermediate frequency signal having a frequency higher than a frequency of the low frequency signal; and
transmitting, over the twisted pair wire, the intermediate frequency signal to the second network node; and
at the second network node,
receiving the intermediate frequency signal from the first network node, and
converting the received intermediate frequency signal to a high frequency radio signal having a frequency higher than the frequency of the intermediate frequency signal, wherein the high frequency radio signal is used for transmission over an air interface.

23. A cellular system comprising a first radio base station and a second radio base station configured for communication between the first radio base station and the second radio base station over a twisted pair wire,
wherein the first radio base station comprises:
a receiver configured to receive, over the twisted pair wire, an intermediate frequency signal from the second radio base station,
a down-converter configured to convert the received intermediate frequency signal to a low frequency signal having a frequency lower than a frequency of the received intermediate frequency signal,
an up-converter configured to convert a low frequency signal to an intermediate frequency signal having a frequency higher than a frequency of the low frequency signal, and
a transmitter configured to transmit, over the twisted pair wire, the up-converted intermediate frequency signal to the second radio base station; and
wherein the second radio base station comprises:
a receiver configured to receive, over the twisted pair wire, an intermediate frequency signal from the first radio base station,
an up-converter configured to convert the received intermediate frequency signal to a high frequency signal having a frequency higher than a frequency of the received intermediate frequency signal, a down-converter configured to convert a high frequency signal to an intermediate frequency signal having a frequency lower than the frequency of the high frequency signal, and a transmitter configured to transmit, over the twisted pair wire, the down-converted intermediate frequency signal to the first radio base station;

wherein the first radio base station is of a type covering a large geographical area for communication with the second radio base station, which is of a type covering a geographical area smaller than the large geographical area.

24. The cellular system according to claim 23, wherein the receiver is configured to estimate a frequency-dependent attenuation over the twisted pair wire, and for the received intermediate frequency signal, to compensate for the estimated frequency-dependent attenuation, wherein estimating a frequency-dependent attenuation over the twisted pair wire comprises estimating a power spectrum density (PSD) slope over a plurality of frequencies.

* * * * *

UNITED STATES PATENT AND TRADEMARK OFFICE
CERTIFICATE OF CORRECTION

PATENT NO. : 9,918,327 B2
APPLICATION NO. : 15/144100
DATED : March 13, 2018
INVENTOR(S) : Lu et al.

Page 1 of 2

It is certified that error appears in the above-identified patent and that said Letters Patent is hereby corrected as shown below:

On the Title Page

In Item (72), under "Inventors", in Column 1, Line 2, delete "Taby" and insert -- Täby --, therefor.

In Item (72), under "Inventors", in Column 1, Line 3, delete "Jarfalla" and insert -- Järfälla --, therefor.

In Item (72), under "Inventors", in Column 1, Line 4, delete "Vasby" and insert -- Väsby --, therefor.

In the Figure, for Tag "804", Line 2, delete "Intermediate" and insert -- intermediate --, therefor.

In the Drawings

In Fig. 2, Sheet 1 of 8, delete " 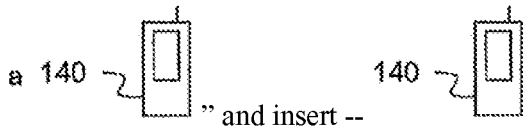 " and insert -- 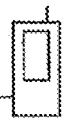 --, therefor.

In Fig. 9, Sheet 4 of 8, for Tag "513", in Line 4, delete "channels." and insert -- channels --, therefor.

In the Specification

In Column 1, Line 12, delete "2012," and insert -- 2012, now Pat. No. 9,380,636, --, therefor.

In Column 3, Line 14, delete "node" and insert -- node. --, therefor.

In Column 3, Line 47, delete "node" and insert -- node. --, therefor.

In Column 4, Line 35, delete "is" and insert -- is a --, therefor.

In Column 6, Lines 36-37, delete "first BS 21 to a second BS 11." and insert -- second BS 21 to a Signed and Sealed this
Twenty-second Day of May, 2018

Andrei Iancu
*Director of the United States Patent and Trademark Office* first BS 11. --, therefor.

In Column 12, Line 9, delete "logic unit 128" and insert -- logic unit 126 --, therefor.

In the Claims

In Column 17, Line 50, in Claim 11, delete "station," and insert -- station; --, therefor.

In Column 18, Line 6, in Claim 12, delete "first network node" and insert -- first radio base station --, therefor.

In Column 18, Line 26, in Claim 13, delete "node," and insert -- node; --, therefor.

In Column 19, Line 27, in Claim 18, delete "node," and insert -- node; --, therefor.

In Column 19, Line 37, in Claim 18, delete "signal; and" and insert -- signal; --, therefor.